Jan. 5, 1932.  W. G. THUMMEL  1,839,936
INTERNAL COMBUSTION ENGINE
Filed May 3, 1928   2 Sheets-Sheet 1

INVENTOR
W.G. THUMMEL
BY  E. E. Huffman.
ATTORNEY

Patented Jan. 5, 1932

1,839,936

UNITED STATES PATENT OFFICE

WILLIAM G. THUMMEL, OF ST. LOUIS, MISSOURI

INTERNAL COMBUSTION ENGINE

Application filed May 3, 1928. Serial No. 274,748.

My invention relates to an internal combustion engine and more particularly to that form of engine in which the excess pressure from the cylinders, which are of the well known two-cycle type, is discharged by means of relief valves against the vanes of a turbine flywheel; thus not only utilizing power which would otherwise be wasted, but also preventing back firing in the crank case by means of the reduction in pressure thus secured.

The object of my invention is to improve the mechanical construction of engines of the type above referred to, and also to provide improved means for supporting and packing the crank shafts so as to improve the compression of the fuel gases in the crank case.

Figure 1:
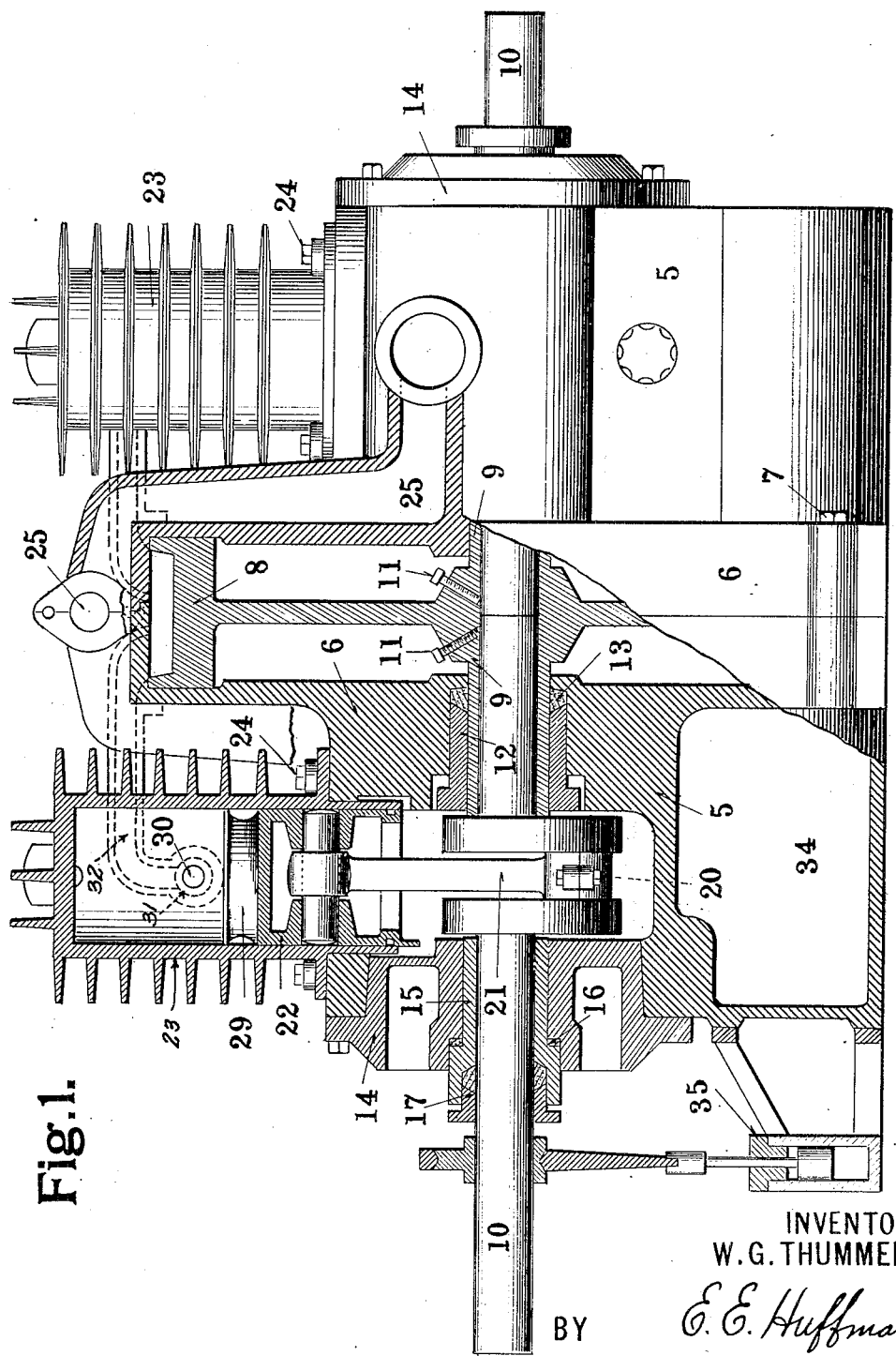
Figure 2:
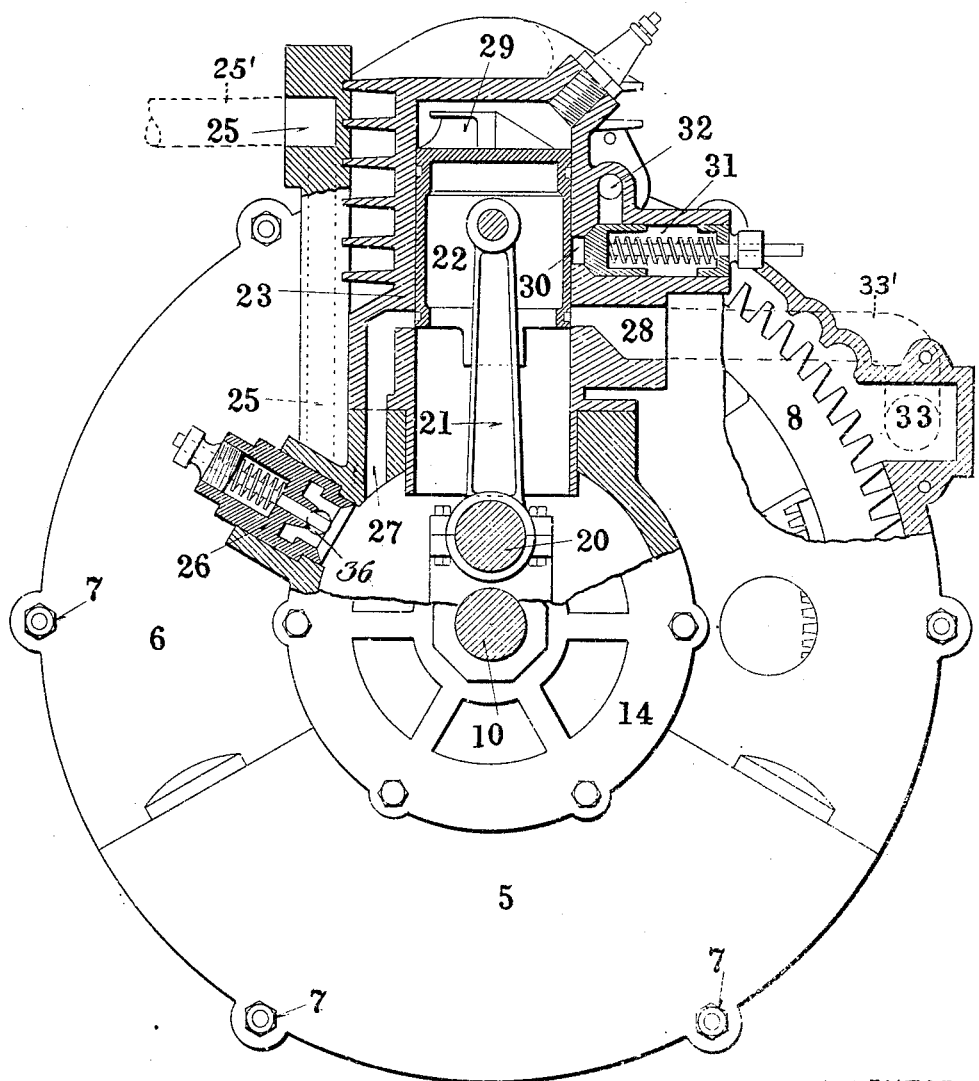

In the accompanying drawings, which illustrate one form of engine made in accordance with my invention, Figure 1 is a front view partly in elevation and partly in section, and Figure 2 is an end view, also partly in section and partly in elevation.

The base of my engine consists of two parts, each comprising a crank case 5 and a flywheel housing member 6. The housing member 6 of the two parts are secured together by bolts 7 to form a complete housing for the turbine fly-wheel 8, which is provided with an extended hub 9 adapted to receive the inner ends of the crank shafts 10 to which the hub 9 is rigidly secured by set-screws 11 so as to form, for practical purposes, a part of said shafts.

The inner end of each of the shafts 10, together with the portion of the hub 9 forming a part thereof, is supported in a bearing bushing 12 at the end of which is a packing 13 which may be tightened by moving the bearing bushing 12 longitudinally. This longitudinal movement may be secured in any well known manner. The outer end of each of the crank shafts 10 is supported in a cover 14 bolted to the crank case 5 and carrying a bearing bushing 15. A packing 16 for the exterior of the bushing may be tightened by moving the bearing longitudinally. The interior of the bushing 15 is maintained gas tight by a packing gland 17 of the usual form.

Each of the crank shafts 10 is provided with a crank 20 connected by a pitman rod 21 with a piston 22 in a cylinder 23. The cylinders 23 are formed separately from the crank cases 5 and secured thereto by means of bolts 24. 25 is the gas manifold, one-half of which is formed integral with each part of the engine base and which leads from the gas supply pipe 25' shown in dotted lines in Figure 2 to the interior of the crank case 5, through port 36 an automatic intake valve 26 for each cylinder, being interposed in the manifold in the usual manner. 27 is the inlet port and 28 the outlet port, which ports are uncovered by the piston 22 at the lower end of its stroke, as is usual in two-cycle engines, the incoming fuel being directed upwardly into the cylinder by the deflector 29. The outgoing gases are delivered by a pipe 33' shown in dotted lines in Figure 2 to exhaust 33.

In addition to the usual ports 27 and 28 each cylinder is also provided with a port 30 uncovered by the piston 22 at about 100 degrees of its stroke which port contains an automatic valve 31 and leads through a passage 32 to the turbine fly-wheel 8 so that the products of combustion after reaching a predetermined pressure, controlled by the valve 31, are discharged against the vanes of the fly-wheel to accomplish the results heretofore set forth.

Having fully described my invention, what I claim as new and desire to secure by Letters Patent of the United States is:

1. In an internal combustion engine, the combination with a turbine casing divided into two parts in a vertical plane, of a turbine fly-wheel located between the parts of said casing, an integral extension on each part of said casing forming a cylinder base and provided with a crank chamber, a cover for each chamber forming a shaft bearing, a pair of crank shafts connected by means of said turbine fly-wheel, a removable cylinder carried on each base, and means for discharging excess exhaust pressure from the cylinders to the turbine.

2. In an internal combustion engine, the combination with a turbine casing divided into two parts in a vertical plane, of a turbine fly-wheel located between the parts of said casing, an integral extension on each part of said casing forming a cylinder base and provided with a crank chamber, a cover for each chamber forming a shaft bearing, said cover being of sufficient size to allow of the lateral removal of the wrist pin structure, a pair of crank shafts connected by means of said turbine fly-wheel, a removable cylinder carried on each base, and means for discharging excess exhaust pressure from the cylinders to the turbine.

In testimony whereof, I have hereunto set my hand this 30th day of April 1928.

WILLIAM G. THUMMEL.